US010627529B2

(12) United States Patent
Gordon et al.

(10) Patent No.: US 10,627,529 B2
(45) Date of Patent: Apr. 21, 2020

(54) REAL TIME X-RAY DOSIMETER USING DIODES WITH VARIABLE THICKNESS DEGRADER

(71) Applicant: INTERNATIONAL BUSINESS MACHINES CORPORATION, Armonk, NY (US)

(72) Inventors: Michael S. Gordon, Yorktown Heights, NY (US); John G. Massey, Jericho, VT (US); Kenneth P. Rodbell, Sandy Hook, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 15/843,282

(22) Filed: Dec. 15, 2017

(65) Prior Publication Data
US 2019/0011573 A1    Jan. 10, 2019

Related U.S. Application Data

(63) Continuation of application No. 15/643,771, filed on Jul. 7, 2017.

(51) Int. Cl.
| | |
|---|---|
| *G01T 1/02* | (2006.01) |
| *G01T 1/29* | (2006.01) |
| *G21K 1/02* | (2006.01) |
| *G21K 1/10* | (2006.01) |

(52) U.S. Cl.
CPC .................. *G01T 1/02* (2013.01); *G01T 1/29* (2013.01); *G21K 1/025* (2013.01); *G21K 1/10* (2013.01)

(58) Field of Classification Search
CPC .............. G01T 1/02; G01T 1/29; G21K 1/025
See application file for complete search history.

(56) References Cited

U.S. PATENT DOCUMENTS

| | | | |
|---|---|---|---|
| 2,467,812 A | | 4/1949 | Clapp |
| 4,575,676 A | | 3/1986 | Palkuti |
| 4,825,454 A | | 4/1989 | Annis et al. |
| 5,687,210 A | * | 11/1997 | Maitrejean ........... G01N 23/083 378/57 |

(Continued)

FOREIGN PATENT DOCUMENTS

EP    2 457 513    5/2015

OTHER PUBLICATIONS

International Search Report and Written Opinion dated Sep. 25, 2018 for International Application No. PCT/IB2018/054456, 9 pages.

(Continued)

*Primary Examiner* — Christine S. Kim
(74) *Attorney, Agent, or Firm* — Tutunjian & Bitetto, P.C.; Vazken Alexanian

(57) ABSTRACT

A radiation exposure system having a beam source is provided. The system further includes a variable thickness degrader, positioned between the beam source and an object to be exposed, for providing varying degrees of degradation to a radiation beam emitted from the beam source onto the object. The system also includes a set of detectors, positioned between the variable thickness degrader and the object, for receiving and measuring only a portion of the radiation beam remaining after the degradation of the radiation beam by the variable thickness degrader.

17 Claims, 12 Drawing Sheets

(56) References Cited

U.S. PATENT DOCUMENTS

| | | | |
|---|---|---|---|
| 5,771,272 A | 6/1998 | Berger et al. | |
| 7,336,768 B2 | 2/2008 | Ogawa | |
| 7,519,161 B2 | 4/2009 | Horstman et al. | |
| 7,916,839 B2 | 3/2011 | Halazonetis et al. | |
| 8,130,901 B2 | 3/2012 | Muller | |
| 8,218,721 B2 | 7/2012 | Raupach et al. | |
| 8,890,079 B2 | 11/2014 | Kurochi et al. | |
| 2013/0256545 A1* | 10/2013 | Kim | G01T 1/247 250/370.09 |
| 2014/0072098 A1* | 3/2014 | Kappler | A61B 6/032 378/19 |
| 2014/0275699 A1 | 9/2014 | Benna et al. | |
| 2016/0084970 A1* | 3/2016 | Guo | G01T 1/248 250/370.14 |
| 2016/0170076 A1 | 6/2016 | Singh | |
| 2017/0258412 A1* | 9/2017 | Daerr | A61B 6/032 |

OTHER PUBLICATIONS

Scheick, L., "Testing Guideline for Single Event Gate Rupture (SEGR) of Power MOSFETs", National Aeronautics and Space Administration, JPL Publication, Feb. 2008, 49 Pages.

List of IBM Patents or Patent Applications Treated as Related dated Dec. 15, 2017, 2 pages.

* cited by examiner

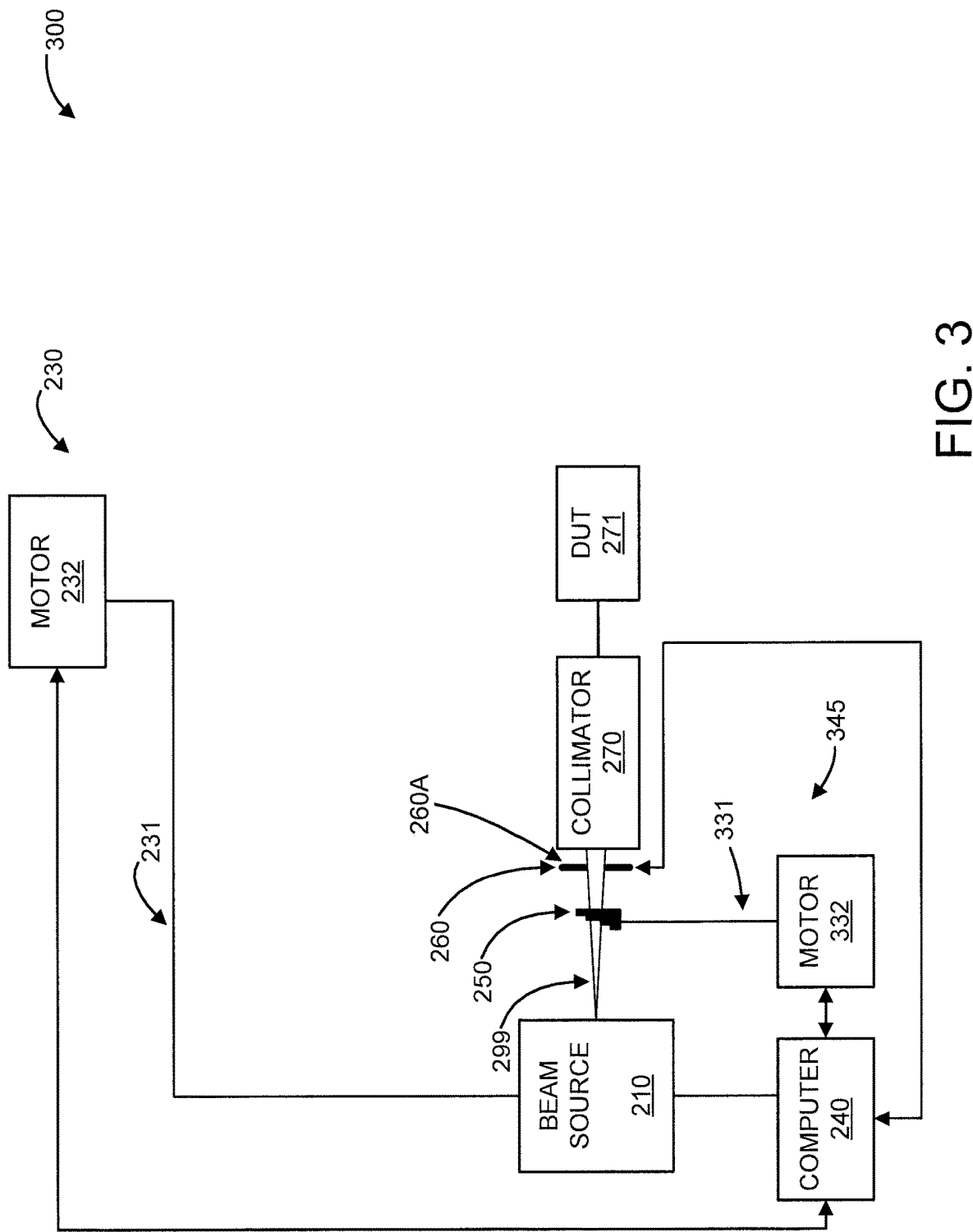

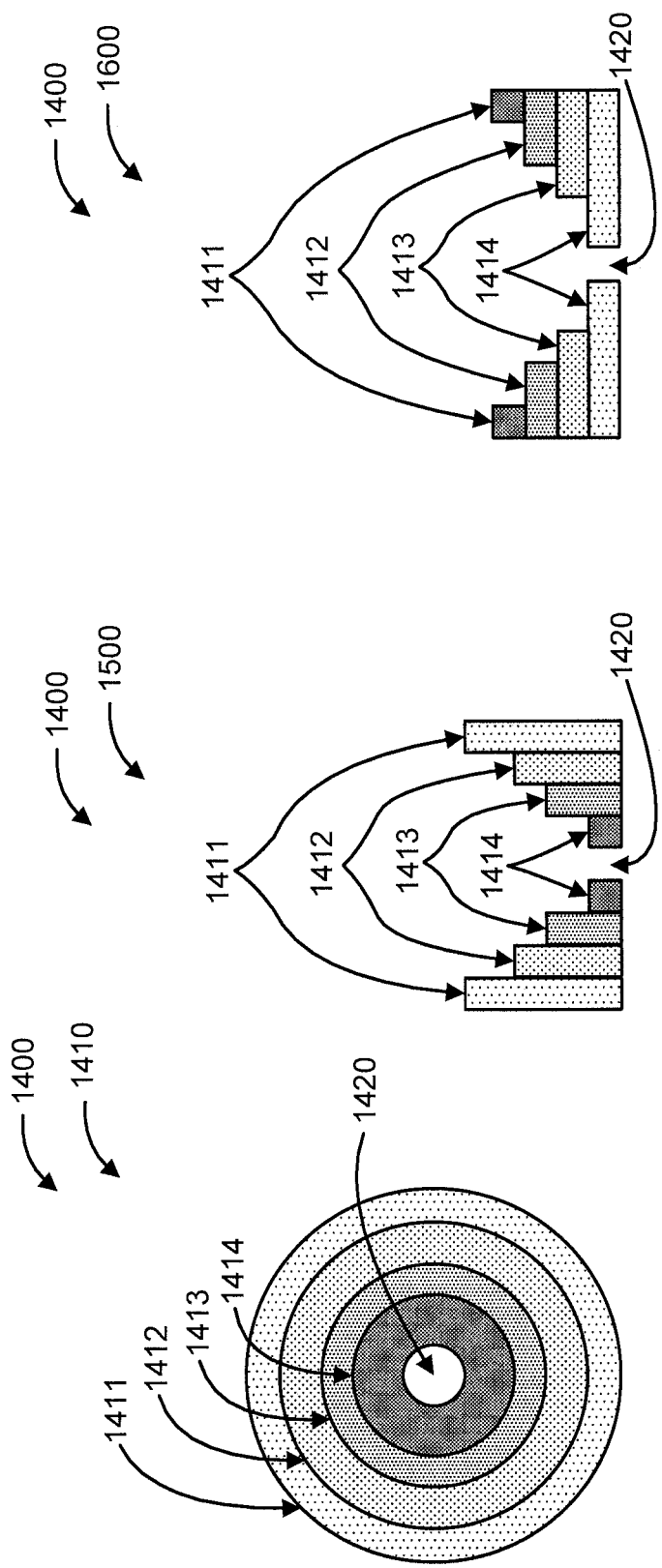

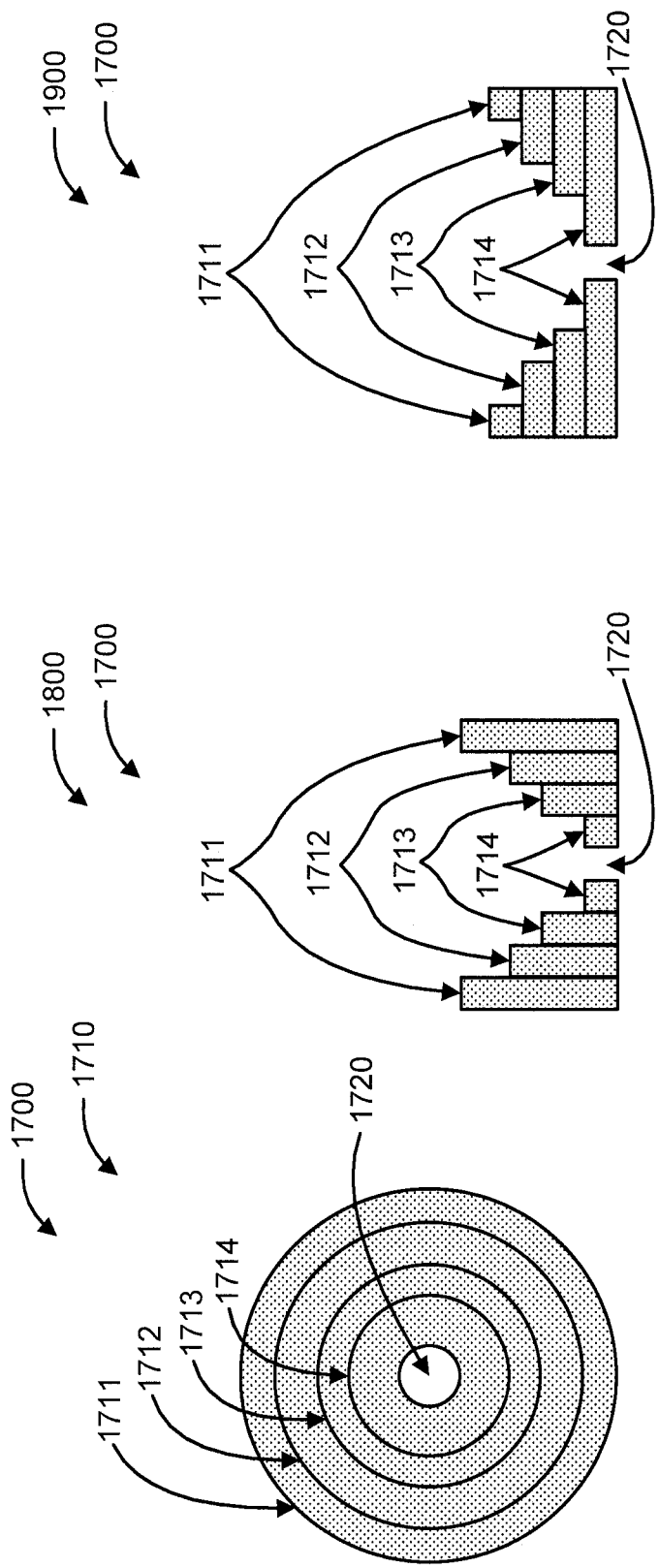

REAL TIME X-RAY DOSIMETER USING DIODES WITH VARIABLE THICKNESS DEGRADER

BACKGROUND

Technical Field

The present invention relates generally to radiation exposure and, in particular, to a real time x-ray dosimeter that uses diodes with a variable thickness degrader.

Description of the Related Art

Applications that require long term X-ray exposures at high intensities (e.g., Total Ionizing Dose (TID) evaluation of semiconductor components) need the ability to accurately monitor and measure exposure times as well as the x-ray flux in real time.

If an X-ray system shuts down (e.g., due to external factors such as cooling water supply issues), the test system needs the ability to record the time that the exposure ended for accurate calculation of the total dose applied to the sample.

The test system needs the ability to monitor the X-ray flux as a function of time to measure beam stability over the exposure time. The test system can extend or reduce the exposure of the sample to ensure the desired total dose is achieved.

Today most systems operate in an "open loop", meaning that they are operated for a given time, and no in-situ monitoring is done. Thus, there is a need for a real-time x-ray monitor.

SUMMARY

According to an aspect of the present invention, a radiation exposure system having a beam source is provided. The system further includes a variable thickness degrader, positioned between the beam source and an object to be exposed, for providing varying degrees of degradation to a radiation beam emitted from the beam source onto the object. The system also includes a set of detectors, positioned between the variable thickness degrader and the object, for receiving and measuring only a portion of the radiation beam remaining after the degradation of the radiation beam by the variable thickness degrader.

According to another aspect of the present invention, a computer program product is provided for radiation beam control. The computer program product includes a non-transitory computer readable storage medium having program instructions embodied therewith. The program instructions are executable by a computer to cause the computer to perform a method. The method includes providing, by a variable thickness degrader positioned between the beam source and an object to be exposed, varying degrees of degradation to a radiation beam emitted from the beam source onto the object. The method further includes receiving and measuring, by a set of detectors positioned between the variable thickness degrader and the object, only a portion of the radiation beam remaining after the degradation of the radiation beam by the variable thickness degrader.

According to yet another aspect of the present invention, a method is provided for radiation beam control performed by a radiation exposure system having a beam source. The method includes providing, by a variable thickness degrader positioned between the beam source and an object to be exposed, varying degrees of degradation to a radiation beam emitted from the beam source onto the object. The method further includes receiving and measuring, by a set of detectors positioned between the variable thickness degrader and the object, only a portion of the radiation beam remaining after the degradation of the radiation beam by the variable thickness degrader.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 3 shows another exemplary radiation exposure system to which the present principles can be applied, in accordance with an embodiment of the present principles;

FIG. 14 shows an additional embodiment of a variable thickness degrader system that uses a set of variable thickness degraders implemented as concentric rings of different materials, in accordance with an embodiment of the present invention;

FIG. 15 shows a cross-section of the variable thickness degrader system of FIG. 14, in accordance with an embodiment of the present invention;

FIG. 16 shows another view of the variable thickness degrader system of FIG. 14, in accordance with an embodiment of the present invention;

FIG. 17 shows a further embodiment of a variable thickness degrader system that uses a set of variable thickness degraders implemented as concentric rings of different materials, in accordance with an embodiment of the present invention;

FIG. 18 shows a cross-section of the variable thickness degrader system of FIG. 17, in accordance with an embodiment of the present invention;

FIG. 19 shows another view of the variable thickness degrader system of FIG. 17, in accordance with an embodiment of the present invention.

DETAILED DESCRIPTION

The present invention is directed to a real time x-ray dosimeter that uses diodes with a variable thickness degrader.

It is well established that X-rays penetrating materials generate charge. The present invention exploits this fact to measure the current generated by the X-ray fluence in a system using reversed-bias diodes, with the addition of material between the X-ray source and the diodes. It is to be appreciated that other sensors types (besides diodes) can also be used in accordance with the teachings of the present invention, while maintaining the spirit of the present invention. Such sensors types can include, but are not limited to, scintillators, and so forth.

Moreover, to prevent damage to the diodes, a variable thickness degrader is used to attenuate the x-ray flux to which the diodes are exposed. Various implementations of a variable thickness degrader are described herein. In an embodiment, multiple sensors are arranged between the variable thickness degrader and an object of interest (e.g., a device under test (DUT)), such that the sensors are within the degraded beam but not within the full intensity portion of the beam. Thus, in an embodiment, a full (un-attenuated) radiation beam can be used for the object of interest while an attenuated beam can be simultaneously used for monitoring purposes. That is, in an embodiment, an attenuated beam and a collimated beam are simultaneously used (e.g., for monitoring and testing, respectively). In an embodiment, the attenuated beam can be used to determine if the flux is constant or if the flux is changing during the course of an experiment/application. In an embodiment, the attenuated beam can be used for dose calibration. It is to be appreciated that the size of the variable thickness degrader is larger than the sensors used for beam intensity monitoring, in order to prevent damage to the underlying sensors.

The present invention can be used for high and low flux applications. For example, the present invention can be applied to a system using a dose rate of approximately 1 Mrad/hr or other dose rates, as readily appreciated by one of ordinary skill in the art, while maintaining the spirit of the present invention.

Figure 1:
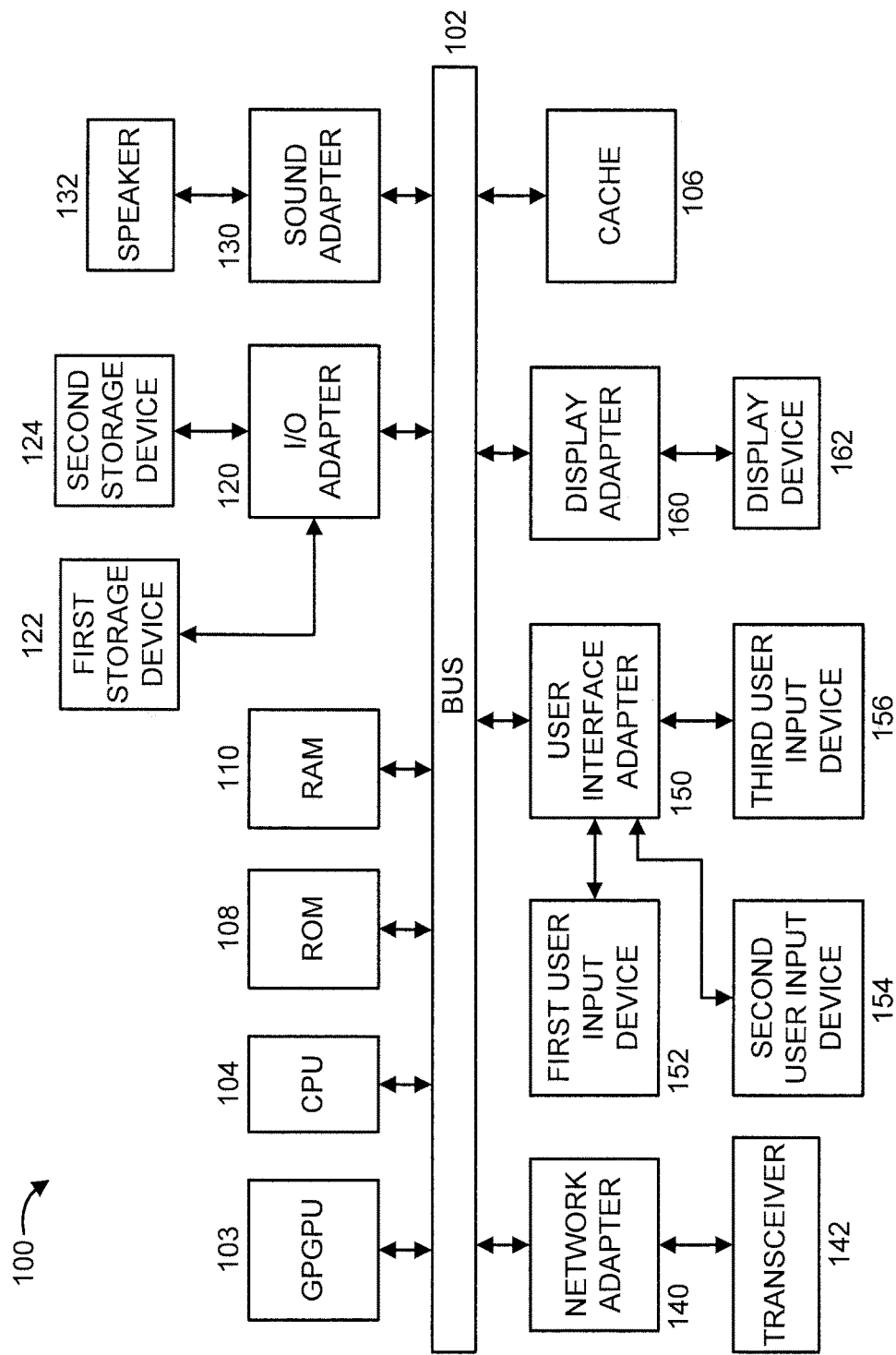
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
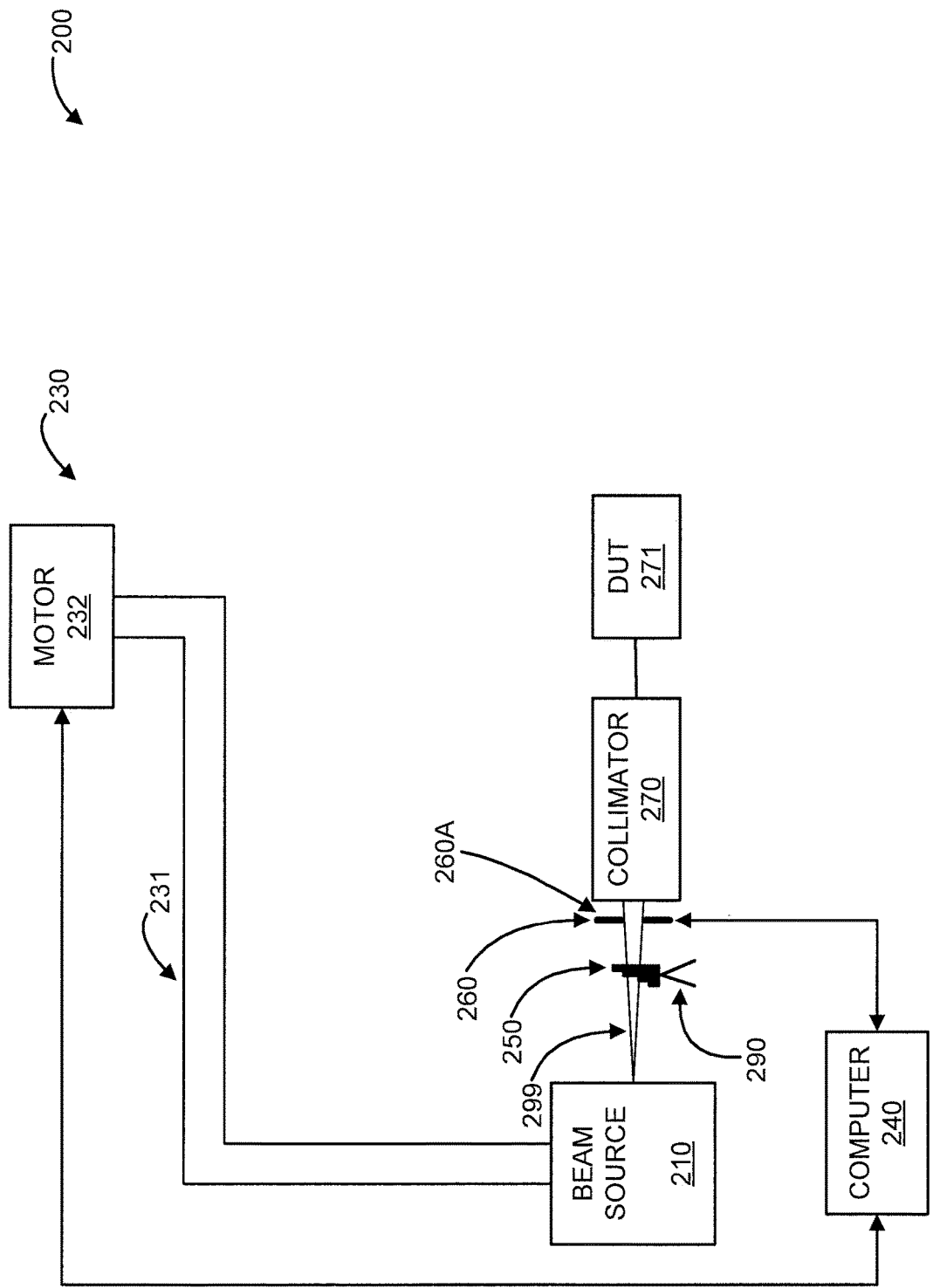
FIG. 2 shows an exemplary radiation exposure system to which the present principles can be applied, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Also, it is to be appreciated that system 300 described below with respect to FIG. 3 is a system for implementing respective embodiments of the present principles. Part or all of processing system 100 may be implemented in one or more of the elements of system 300.

Figure 20:
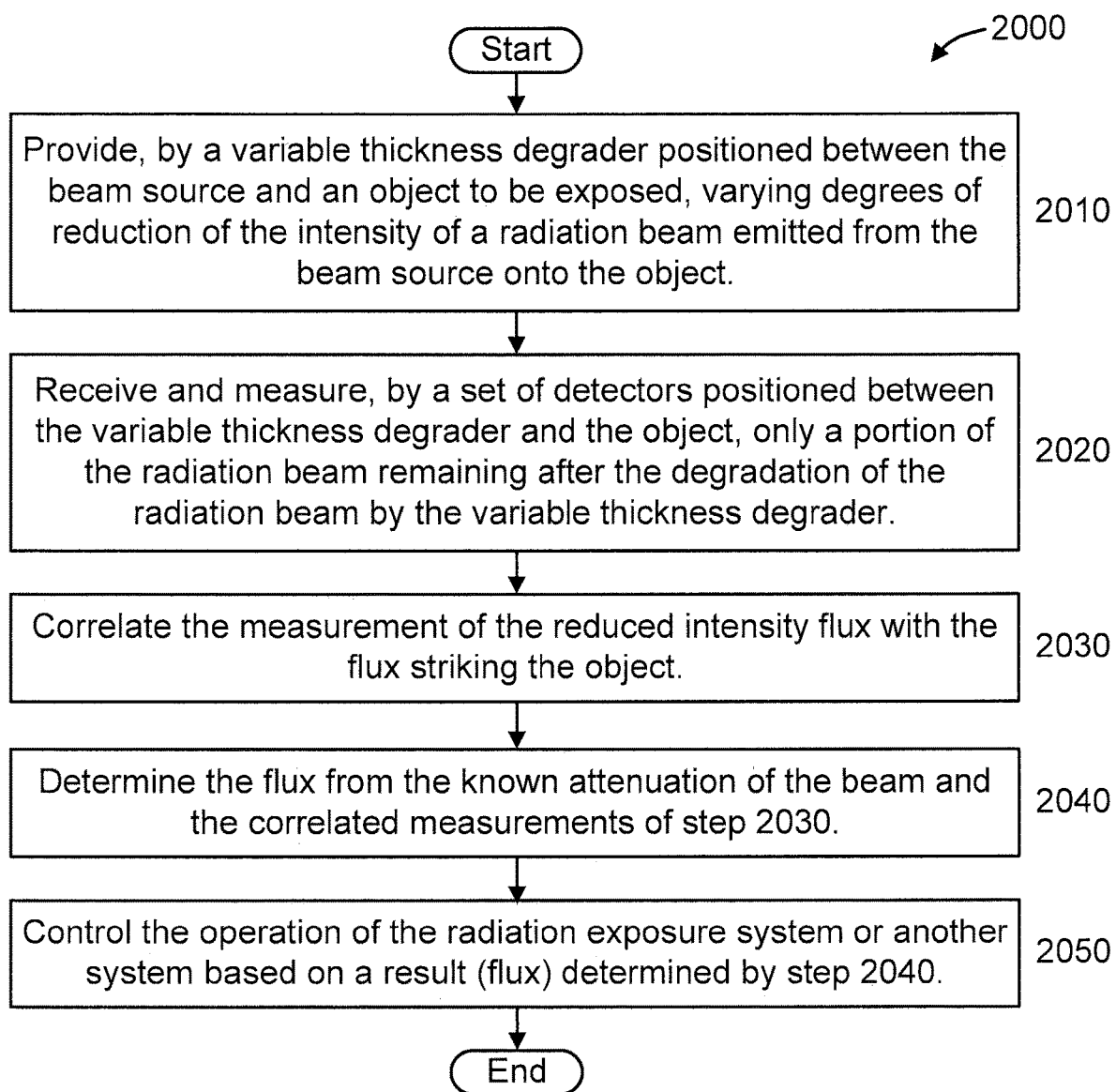
FIG. 20 shows an exemplary method for real time x-ray dosimetry, in accordance with an embodiment of the present invention.

Further, it is to be appreciated that processing system 100 may perform at least part of the method described herein including, for example, at least part of method 2000 of FIG. 20. Similarly, part or all of system 200 may be used to perform at least part of method 2000 of FIG. 20. Additionally, part or all of system 300 may be used to perform at least part of method 2000 of FIG. 20.

FIG. 2 shows an exemplary radiation exposure system 200 to which the present principles can be applied, in accordance with an embodiment of the present principles.

The radiation exposure system 200 includes a beam source (e.g., an x-ray tube) 210, a positional device 230, and a computer 240.

The beam source 210 provides a radiation source for emitting radiation 299 to a target structure. In an embodiment, the beam source generates x-rays.

The positional device 230 is attached to and positions the beam source 210 relative to an object of interest (e.g., device under test in the example of FIG. 2, but can also be other objects, such as objects under test (e.g., semiconductor devices, machine parts, etc.) 271 to emit radiation to one or more target structures (e.g., semiconductor devices, machine parts, etc.) in the object of interest. Often, the positional device 230 includes a structural member 231 to secure the beam source 210 for positioning, and a motor 232 to position the structural member 231 with respect to the one or more target structures.

The computer 240 controls the elements of system 200. For example, the computer 240 activates the beam source 210, and controls the movement of the positional device 230. Wiring for such control can be within the structural member 231 or in some other arrangement. The computer 240 includes a processor 240A and a memory 240B. The processor 240A initiates the controlling of the other elements including, for example, the emission of radiation by the beam source 210. The memory 240B stores software for performing a radiation exposure process. The memory 240B can also store data generated during a radiation exposure process.

X-ray sources, such as beam source 210, have a large beam size which is typically collimated to control exposure size on the sample being tested. Hence, system 200 includes a collimator 270.

System 200 further includes a variable thickness degrader 250 and a circuit (e.g., a diode or scintillator circuit) 260 having a set of monitors/detectors (hereinafter "monitors" or "detectors" in short) (e.g., diodes or scintillators) 260A. The variable thickness degrader 250 has a plurality of material with different thickness. In the embodiment of FIG. 2, the variable thickness degrader 250 is placed on a moveable stand 290. Of course, other devices and systems can be used to position the variable thickness degrader (see, e.g., FIG. 3), while maintaining the spirit of the present invention.

The current levels generated in the monitors 260A are proportional to the x-ray intensity. Thus, the monitors 260A can be used to monitor in real-time the x-ray flux during sample exposure.

However, it is well known that high intensity X-rays can create damage in semiconductor devices such as, for example, diodes, and thus possibly limit the lifetime of the monitors (e.g., diodes). Hence, in an embodiment, the intensity of the x-ray beam is reduced for monitoring purposes without affecting the portion of the beam used for sample exposure.

It is well known that various materials (e.g., copper or aluminum) can reduce the x-ray intensity related to the thickness by $I=I_0 e_1^{-\mu_t t}$, where I is the intensity of the beam, t is the thickness of the material and $\mu_t$ is the linear absorption coefficient that is dependent on the material used. Hence, the variable thickness degrader 250 is used to reduce the exposure level of the monitors 260A.

In one embodiment, the variable thickness degrader 250 is implemented as a movable plate of a known material of varying thickness that lies between the beam source 210 and the monitors 260A on top of the collimator 270 and has a hole in the material above the collimator window. Thus, the full x-ray beam can go through the collimator 270 but the monitors 260A are shielded from the full beam, thus extending their life by minimizing damage from the x-ray beam.

The required thickness of the degrader 250 can be calculated based on the various intensities of x-rays generated in the test system in order to yield enough current in the monitors 260A to be reliably monitored during exposure.

Figure 4:
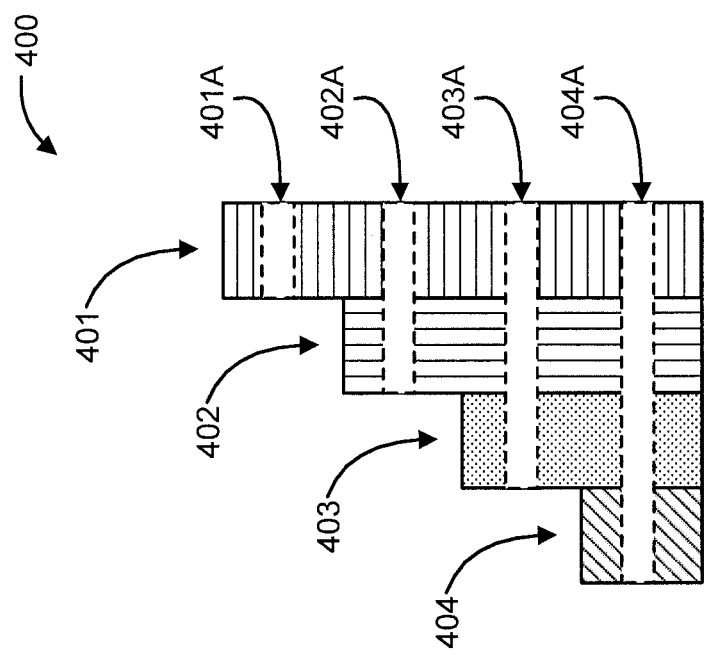
FIG. 4 shows a side view of an exemplary variable thickness degrader formed from different materials, in accordance with an embodiment of the present invention.

To further improve the degrader 250, multiple materials can be stacked on top of one another to achieve the desired reduced flux with a reasonable thickness of the plate (see FIG. 4). In another embodiment, the degrader plate can have the same material with adjacent segments of different thickness added (or subtracted) as needed (see FIG. 8).

FIG. 3 shows another exemplary radiation exposure system 300 to which the present principles can be applied, in accordance with an embodiment of the present principles.

The radiation exposure system 300 includes a beam source 210, a positional device 230, a computer 240, a positional device 345, a variable thickness degrader 250, a circuit 260 having a set of monitors 260A, and a collimator 270.

System 300 differs from system 200 in the inclusion of positional device 345 and the omission of moveable stand 290. Positional device 345 is used to control a position of the variable thickness degrader 250 (compared to manual positioning via the moveable stand 290 in FIG. 2). The positional device 345 can include a structural member 331 to secure the variable thickness degrader 250 for positioning, and a motor 332 to position the structural member 231 with respect to the one or more target structures.

Figure 5:
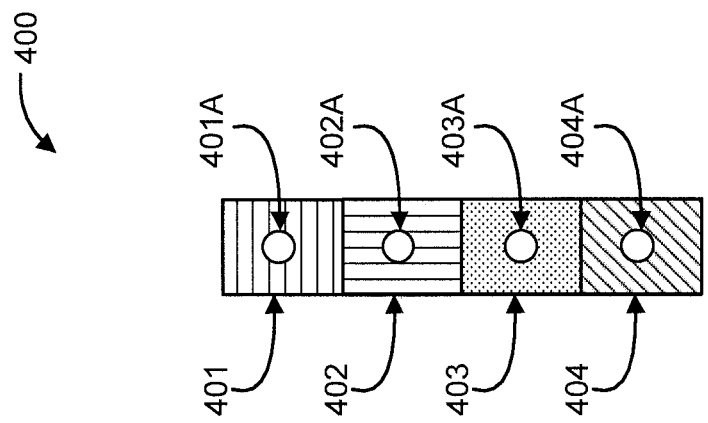
FIG. 5 shows a front view of the variable thickness degrader of FIG. 4, in accordance with an embodiment of the present invention.

FIG. 4 shows a side view of an exemplary variable thickness degrader 400 formed from different materials, in accordance with an embodiment of the present invention. FIG. 5 shows a front view of the variable thickness degrader 400 of FIG. 4, in accordance with an embodiment of the present invention.

In the embodiment of FIGS. 4 and 5, the variable thickness degrader 400 is formed from multiple different materials (e.g., material 401, material 402, material 403, and material 404, as shown in FIGS. 4 and 5 using different hatch patterns). The different materials enable flux reduction of both high and low intensity beams with a single degrader.

In the embodiment of FIGS. 4 and 5, the variable thickness degrader 400 is implemented, for example, by respective rectangular plates such that each different material is on a different plate. As shown in FIG. 5, each of materials (plates) 401, 402, 403, and 404 has a hole 401A, 402A, 403A, and 404A, respectively, for the beam to pass through.

Figure 7:
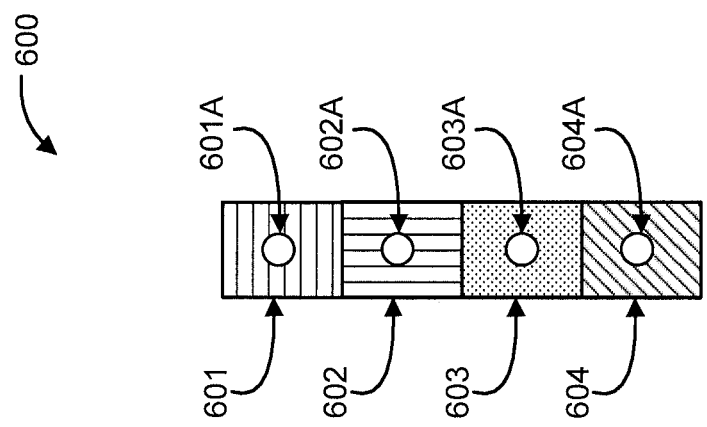
FIG. 7 shows a top view of the variable thickness degrader of FIG. 6, in accordance with an embodiment of the present invention.
Figure 6:
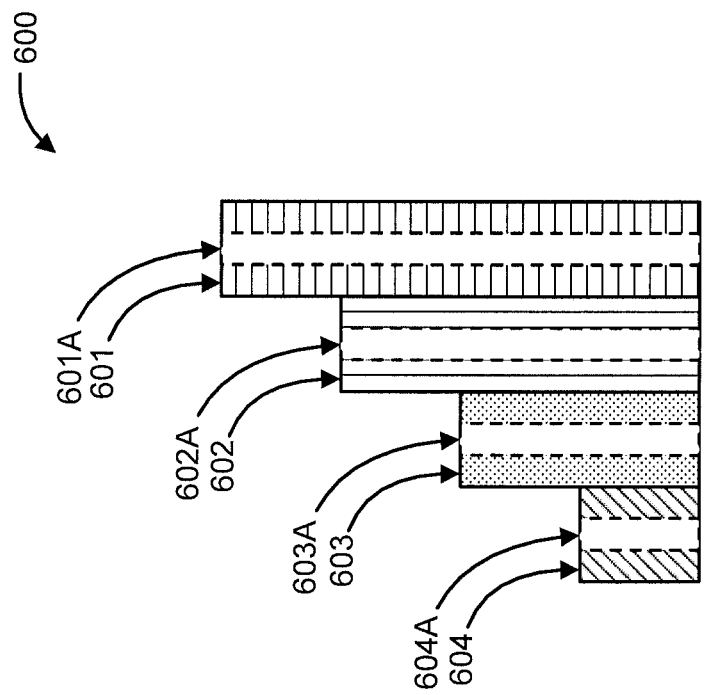
FIG. 6 shows a side view of an exemplary variable thickness degrader formed from different materials, in accordance with an embodiment of the present invention.

FIG. 6 shows a side view of an exemplary variable thickness degrader 600 formed from different materials, in accordance with an embodiment of the present invention. FIG. 7 shows a top view of the variable thickness degrader 600 of FIG. 6, in accordance with an embodiment of the present invention. The variable thickness degrader 600 depicted in FIGS. 6 and 7 is similar to the variable thickness degrader 400 depicted in FIGS. 4 and 5, with the exception of the arrangement of the holes 601A, 602A, 603A, and 604A through degraders 601, 602, 603, and 604, respectively. Also, in FIGS. 6 and 7, the flux attenuation for a specific degrader uses one material, e.g., 601, whereas in FIGS. 4 and 5, with the exception of the smallest degrader 401, the beam passes through a degrader made with multiple materials.

Figure 9:
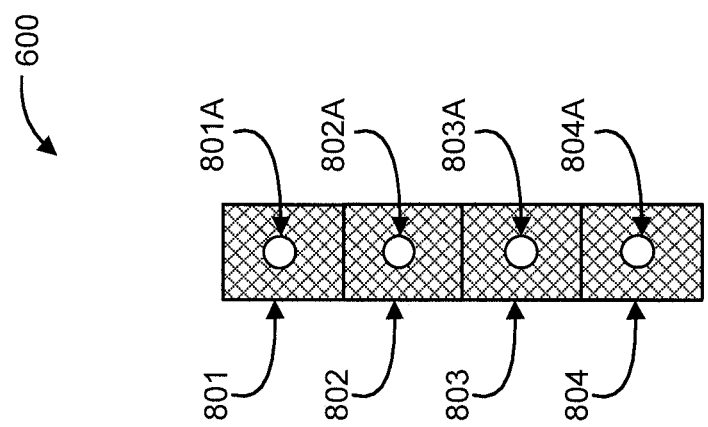
FIG. 9 shows a front view of the variable thickness degrader of FIG. 8, in accordance with an embodiment of the present invention.
Figure 8:
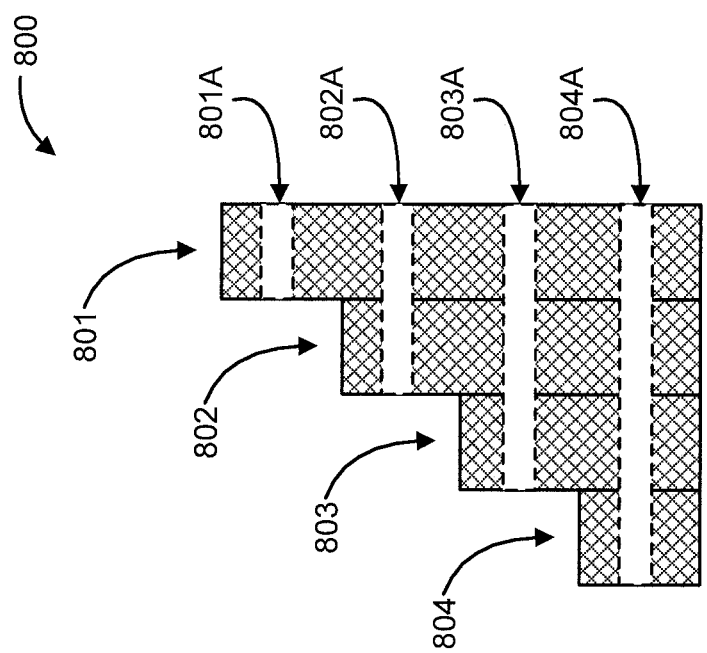
FIG. 8 shows a side view of another exemplary variable thickness degrader formed from the same material, in accordance with an embodiment of the present invention.

FIG. 8 shows a side view of another exemplary variable thickness degrader 800 formed from the same material, in accordance with an embodiment of the present invention. FIG. 9 shows a front view of the variable thickness degrader 800 of FIG. 8, in accordance with an embodiment of the present invention.

In the embodiment of FIGS. 8 and 9, the variable thickness degrader 800 is formed from the same material (e.g., material 801-804, as shown in FIGS. 8 and 9 using a consistent (the same) hatch pattern).

The different thicknesses are used to reduce the intensity of the x-ray beam that strikes the diodes underneath the plate. Each segment has a hole that will align over the collimator window but will not directly expose the diodes underneath the disk. The plate can be moved to allow the various segments to intersect the x-ray beam directly above the diodes. Thus, the beam that strikes the monitors will be reduced in intensity but allow the full intensity into the collimator. The segment selected will be for a specific intensity x-ray beam to yield measurable current in the diodes without causing significant damage. If the intensity of the beam is changed, the plate can be moved to another segment appropriate for the new intensity. This process can be automated by mounting the variable thickness degrader 800 on a stepper motor that is controlled by the test system (see, e.g., FIG. 3).

In the embodiment of FIGS. 8 and 9, the variable thickness degrader 800 is implemented, for example, by respective rectangular plates. In an embodiment, the plates can be stacked as needed. As shown in FIG. 9, each of materials (plates) 801, 802, 803, and 804 has a hole 801A, 802A, 803A, and 804A, respectively, for the beam to pass through.

Figure 11:
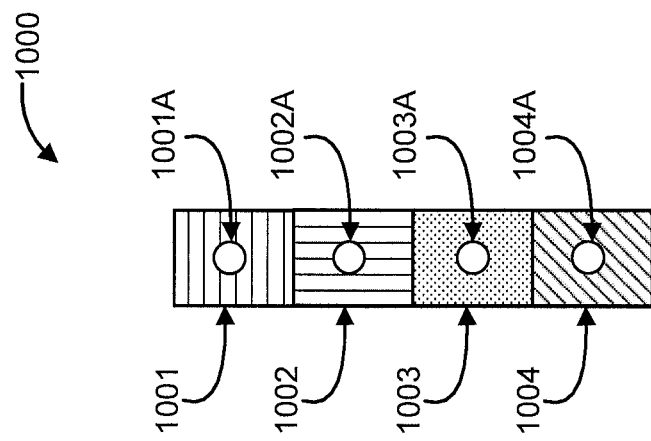
FIG. 11 shows a front view of the variable thickness degrader of FIG. 10, in accordance with an embodiment of the present invention.
Figure 10:
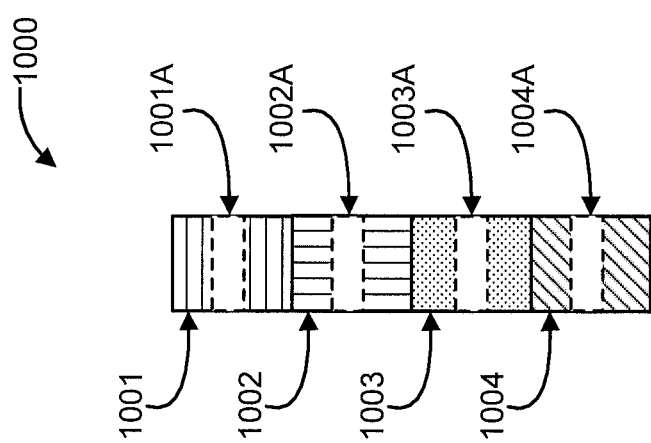
FIG. 10 shows a side view of another exemplary variable thickness degrader formed from different materials, in accordance with an embodiment of the present invention.

FIG. 10 shows a side view of another exemplary variable thickness degrader 1000 formed from different materials, in accordance with an embodiment of the present invention. FIG. 11 shows a front view of the variable thickness degrader 1000 of FIG. 10, in accordance with an embodiment of the present invention.

In the embodiment of FIGS. 10 and 11, the variable thickness degrader 1000 is formed from multiple different materials (e.g., material 1001, material 1002, material 1003, and material 1004, as shown in FIGS. 10 and 11 using different hatch patterns). In contrast to the example of FIGS. 10-11, the different materials do not overlap, but instead are consecutive. The different materials can be joined at adjacent borders using any joining mechanism or approach as readily appreciated by one of ordinary skill in the art, and is, thus, not limited to any particular joining mechanism or approach.

In the embodiment of FIGS. 10 and 11, the variable thickness degrader 1000 is implemented, for example, by respective rectangular plates such that each different material is on a different plate. As shown in FIG. 11, each of materials (plates) 1001, 1002, 1003, and 1004 has a hole 1001A, 1002A, 1003A, and 1004A, respectively, for the beam to pass through.

While FIGS. 4-11 show a variable thickness degrader essentially formed from rectangular plates, other shapes can also be used in accordance with the teachings of the present invention, while maintaining the spirit of the present invention. For example, square, circular, elliptical, and other shapes can also be used (see, e.g., FIGS. 12 and 14-19). Moreover, while four plates have been shown, any number of plates or materials or sections can be used in other embodiments, while maintaining the spirit of the present invention. These and other variations of a variable thickness degrader are readily contemplated by one of ordinary skill in the art given the teachings of the present invention provided herein, while maintaining the spirit of the present invention.

Figure 12:
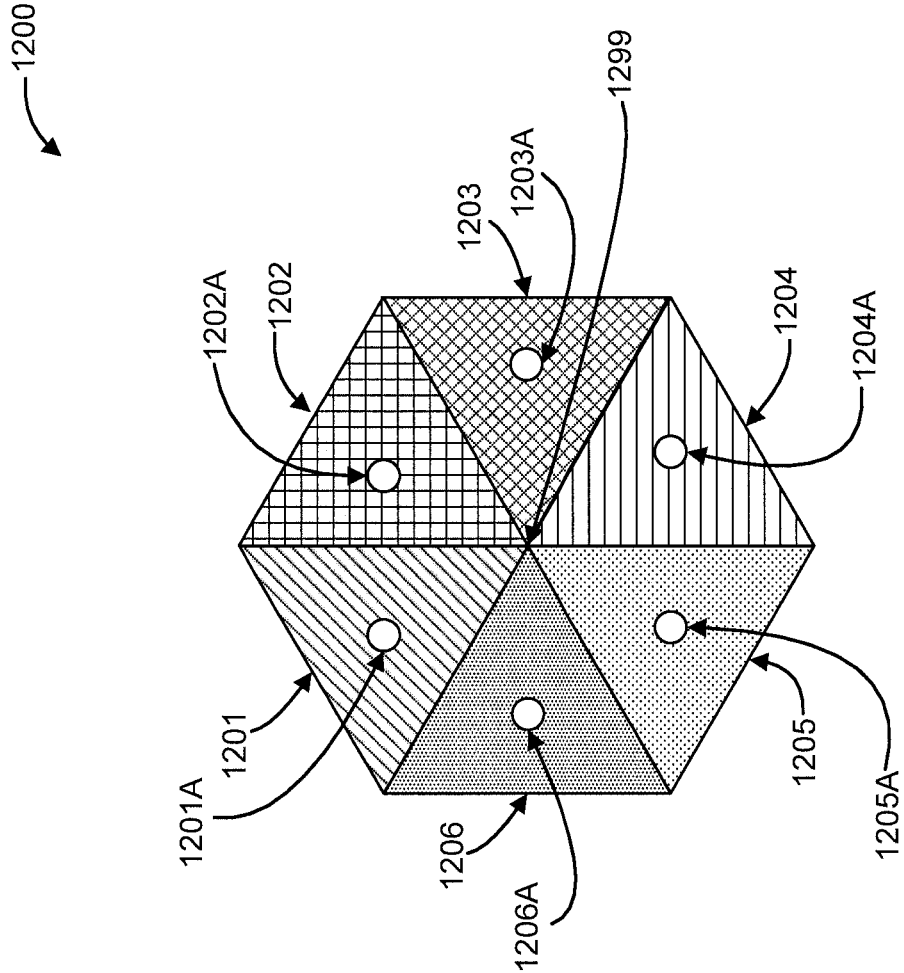
FIG. 12 shows another variable thickness degrader having a semi-circular shape, in accordance with an embodiment of the present invention.

FIG. 12 shows another variable thickness degrader 1200 having a semi-circular shape, in accordance with an embodiment of the present invention. The variable thickness degrader 1200 has various sections 1201 through 1206, shown in FIG. 12 using different hatch patterns, made from multiple different materials or from the same material (e.g., copper, aluminum, and so forth) with multiple different thicknesses. As shown in FIG. 12, each of various sections 1201, 1202, 1203, 1204, 1205, and 1206 has a hole 1201A, 1202A, 1203A, 1204A, 1205A, and 1206A, respectively, for the beam to pass through. The variable thickness degrader 1200 can have it position changed relative to a central axis 1299 so that different sections are exposed to the radiation beam.

The following is a general exemplary discussion of how the present invention can be implemented using the variable thickness degrader described in FIG. 12. As appreciated by one of ordinary skill in the art given the teachings of the present invention provided herein, other variable thickness degrader orientations can also be implemented in a similar fashion while maintaining the spirit of the present invention.

The different materials or different thicknesses are used to reduce the intensity of the x-ray beam that strikes the monitors underneath the variable thickness degrader 1200. Each segment has an opening that will align over the collimator window but will not directly expose the monitors underneath the variable thickness degrader, again noting that the variable thickness degrader is larger than the underlying monitors. The variable thickness degrader 1200 can be rotated to allow the various segments to intersect the x-ray beam directly above the monitors. Thus, the intensity of the beam that strikes the monitors will be reduced but allow the full intensity through the collimator. The segment selected will be for a specific intensity x-ray beam to yield measurable current in the monitors without causing significant damage. If the intensity of the beam is changed, the variable thickness degrader 1200 can be rotated to another segment appropriate for the new intensity. This process can be automated by mounting the variable thickness degrader 1200 on a stepper motor that is controlled by the test system.

Figure 13:
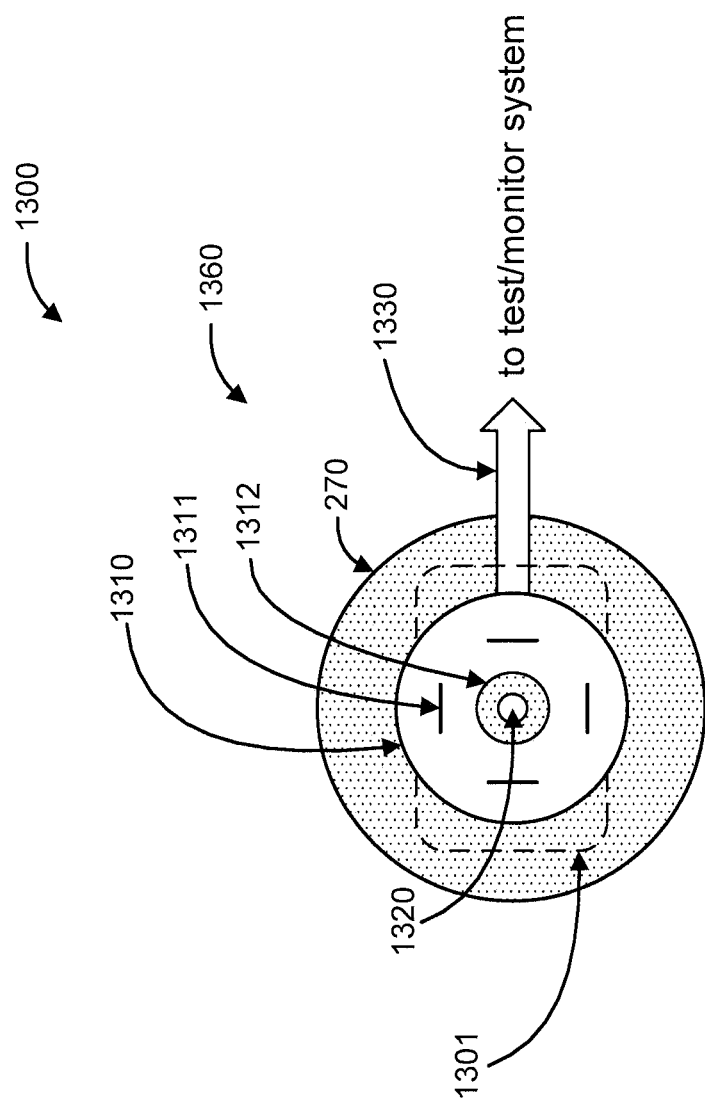
FIG. 13 shows the collimator of FIGS. 2 and 3 and a monitor circuit, in accordance with an embodiment of the present invention.

In FIG. 13 the collimator 270 of FIGS. 2 and 3 and a monitor circuit 1360 are shown, in accordance with an embodiment of the present invention.

In particular, FIG. 13 shows the collimator 270 and the circuit 1360, as well as the cross-section of the x-ray beam 1301 incident on the collimator 270. The viewpoint of FIG. 13 is along the path of the incident x-ray beam 299 (shown in FIGS. 2 and 3) and after the variable thickness degrader 1200. The dotted-line 1301 in FIG. 13 represents the cross-sectional area of the incident x-ray beam 299 (shown in FIGS. 2 and 3) at the top of the collimator. The cross-sectional area 1301 is represented in FIG. 13 as rectangular in shape, but those skilled in the art will recognize different x-ray beam sources 210 can produce incident x-ray beams 299 of various cross-sectional shapes. The circuit 1360 includes a PC board 1310 with an opening 1312 over and concentric with the collimator opening 1320. The PC board 1310 further includes a set of monitors 1311. The monitors 1311 can be diodes or scintillators, as non-limiting examples. For accurate measurements, the monitors 1311 of the monitor circuit 260 should be within the cross-section 1301 of the incident x-ray beam 299. The cross-section 1301 represents (1) a high intensity portion of the incident x-ray beam 299 in the center of the area that travels through the concentric holes in the PC board 1312 and the collimator opening 1320 and (2) a reduced intensity portion of the incident x-ray beam 299 that covers the portion of the PC board 1310 that contains the monitors 1311.

In the embodiment of FIG. 13, the monitors 1311 can be arranged (rectangular in this example, although not limited to any shape) on the PC board 1310 at 0, 90, 180, and 270 degrees around the opening 1312 over the collimator window 1320. The monitors 1311 can be equally spaced in a configuration as shown in FIG. 13, where four monitors 1311 are shown for illustrative purposes. The PC board 1310 can be connected to a monitor/test system (e.g., computer 240) for real time dosimetry via a bus/interface 1330.

Thus, multiple monitors 1311 are distributed around the collimator window 1320 between the beam source 210 and the collimator 270. The multiple monitors 1311 can be used to calculate an average x-ray intensity across the beam area, monitor the intensity of the beam over time, etc. The PC board 1310 provides the capability to monitor each of the monitors' response to the incident x-ray beam (for example, by measuring a resulting current) to monitor beam uniformity.

FIG. 14 shows an additional embodiment of a variable thickness degrader system 1400 that uses a set of variable thickness degraders 1410 implemented as concentric rings of different materials, in accordance with an embodiment of the present invention. The set of variable thickness degraders 1410 includes variable thickness degraders 1411 through 1414 for the sake of illustration, noting that other numbers of degraders can also be used. FIG. 15 shows a cross-section 1500 of the variable thickness degrader system 1400 of FIG. 14, in accordance with an embodiment of the present invention. FIG. 16 shows another view 1600 of the variable thickness degrader system 1400 of FIG. 14, in accordance with an embodiment of the present invention. As an example, in an embodiment, four rings of different diameters are used, where the larger diameter rings are thicker than the smaller diameter rings. Each of the concentric rings has an open hole (collectively denoted by the figure reference numeral 1420) in the center that will align with the hole in the collimator to let the full, un-attenuated beam through the center of the collimator. One or more monitors can be arranged circumferentially under one or more rings.

If the monitors' responses change during an exposure test, the incident x-ray beam has changed or shut down unexpectedly. Accordingly, the exposure time can be shortened or extended by the testing system to achieve the desired total dose based on the real-time measured dose rate or, in the case of a shutdown, the testing system can record the elapsed exposure time for an accurate measure of the total absorbed dose and the system can run longer (when the x-rays are resumed) to make up for the shutdown, and so forth.

While four monitors are shown for illustrative purposes in the example of FIGS. 14 and 15, other numbers and geometric placements of monitors can be used, while maintaining the spirit of the present invention.

FIG. 17 shows a further embodiment of a variable thickness degrader system 1700 that uses a set of variable thickness degraders 1710 implemented as concentric rings of the same material, in accordance with an embodiment of the present invention. The set of variable thickness degraders 1710 includes variable thickness degraders 1711 through 1714 for the sake of illustration, noting that other numbers of degraders can also be used. FIG. 18 shows a cross-section 1800 of the variable thickness degrader system 1700 of FIG. 17, in accordance with an embodiment of the present invention. FIG. 19 shows another view 1900 of the variable thickness degrader system 1700 of FIG. 17, in accordance with an embodiment of the present invention. Hence, the variable thickness degrader system 1700 of FIGS. 17-19 differ from the variable thickness degrader system 1400 of FIGS. 14-16 in that 1700 uses rings formed of the same materials while 1400 uses rings formed of (at least two) different materials.

FIG. 20 shows an exemplary method 2000 for real time x-ray dosimetry, in accordance with an embodiment of the present invention. The method is performed with respect to a radiation exposure system (e.g., radiation exposure system 200 of FIG. 2 or radiation exposure system 300 of FIG. 3). It is to be appreciated that some steps of a radiation exposure process may be omitted from FIG. 20 for the sake of brevity and clarity, with the method 2000 directed to various aspects of the present invention.

At step 2010, provide, by a variable thickness degrader positioned between the beam source and an object to be exposed, varying degrees of reduction of the intensity of a radiation beam emitted from the beam source onto the object. In this way, the amount of radiation to which the set of detectors is exposed can be below an amount that is capable of causing harm to the detectors.

At step 2020, receive and measure, by a set of detectors positioned between the variable thickness degrader and the object, only a portion of the radiation beam remaining after the reduction of the intensity of the radiation beam by the variable thickness degrader. In an embodiment, step 2020 involves monitoring the stability (in terms of dose) of the radiation beam and providing feedback (e.g., for a Total Ionizing Dose (TID) experiment, and so forth).

At step 2030, correlate the measurement of the reduced intensity flux with the flux striking the object. In an embodiment, step 2030 is performed using the variable thickness degrader under the collimator, with a similar detector.

At step 2040, determine the flux from the known attenuation of the beam and the correlated measurements of step 2030.

At step 2050, control the operation of the radiation exposure system or another system based on a result (flux) determined by step 2040. For example, such control can involve, but is not limited to, outputting an amount of radiation the object has been exposed to, restarting the system to resume radiation exposure, moving (e.g., by a robot or other automated device) the object to a next station for processing (e.g., testing, further manufacturing, and so forth), and so forth. Step 2050 can be performed, for example, by the radiation exposure system itself, or a computer processing machine configured to control the radiation exposure system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A radiation exposure system having a beam source, the system further comprising:
   a variable thickness degrader, positioned between the beam source and an object to be exposed, for providing varying degrees of degradation to a radiation beam emitted from the beam source onto the object; and
   a set of detectors, positioned between the variable thickness degrader and the object, for receiving and measuring only a portion of the radiation beam remaining after the degradation of the radiation beam by the variable thickness degrader,
   wherein the variable thickness degrader is formed to include a plurality of sections, and wherein each of the plurality of sections comprises a respective aperture for enabling an un-degraded portion of the radiation beam to pass there through onto the object.

2. The radiation exposure system of claim 1, wherein each of the plurality of sections has a respective one of a plurality of different thicknesses to provide a respective one of the varying degrees of degradation.

3. The radiation exposure system of claim 1, wherein each of the plurality of sections is formed from a respective one of a plurality of different materials to provide a respective one of the varying degrees of degradation.

4. The radiation exposure system of claim 1, wherein the variable thickness degrader is formed from one or more metals.

5. The radiation exposure system of claim 1, wherein the variable thickness degrader is arranged to reduce an amount of radiation exposure applied to the set of detectors to below a threshold amount.

6. The radiation exposure system of claim 1, wherein the set of detectors comprise a set of diodes.

7. The radiation exposure system of claim 1, further comprising a processor for calculating an amount of radiation exposure emitted by the radiation beam based on a current amount in the set of diodes.

8. The radiation exposure system of claim 1, wherein the set of detectors comprise a set of photomultiplier tubes.

9. The radiation exposure system of claim 1, wherein the degrader is formed to have at least a semi-circular shape.

10. The radiation exposure system of claim 9, further comprising a motor for varying a position of a portion of the variable thickness degrader that is exposed to the radiation beam from among a set of predetermined positions corresponding to the varying degrees of degradation.

11. The radiation exposure system of claim 1, wherein the set of detectors are connected to a printed circuit board and arranged symmetrically around an aperture of the printed circuit board.

12. The radiation exposure system of claim 11, wherein the set of detectors comprise four detectors arranged ninety degrees apart.

13. The radiation exposure system of claim 1, further comprising a detection circuit that includes the set of detectors, the detection circuit being configured to detect and record a flux of the radiation beam over time.

14. The radiation exposure system of claim 1, wherein the variable thickness degrader has stepped levels for modulating the degradation of the radiation beam by predetermined amounts.

15. The radiation exposure system of claim 1, wherein the variable thickness degrader is formed from various plates of stackable metal such that different plate combinations formed from the various plates provide different levels of degradation to the radiation beam.

16. The radiation exposure system of claim 1, further comprising a motor for controlling a position of the variable thickness degrader to obtain a particular one of the different levels of degradation.

17. A computer program product for radiation beam control, the computer program product comprising a non-transitory computer readable storage medium having program instructions embodied therewith, the program instructions executable by a computer to cause the computer to perform a method comprising:
   forming a variable thickness degrader to include a plurality of sections;
   providing, by the variable thickness degrader positioned between the beam source and an object to be exposed, varying degrees of degradation to a radiation beam emitted from the beam source onto the object; and
   receiving and measuring, by a set of detectors positioned between the variable thickness degrader and the object, only a portion of the radiation beam remaining after the degradation of the radiation beam by the variable thickness degrader,
   wherein said forming step forms each of the plurality of sections so as to include a respective aperture for enabling an un-degraded portion of the radiation beam to pass there through onto the object.

\* \* \* \* \*